(No Model.)

J. R. KIDDER.
LOUNGE COT.

No. 497,580. Patented May 16, 1893.

WITNESSES
Geo. E. Frech.
Roland H. Fitzgerald

INVENTOR
Joshua R. Kidder
per Lehmann & Pattison
attys.

THE NORRIS PETERS CO., PHOTO-LITHO., WASHINGTON, D. C.

UNITED STATES PATENT OFFICE.

JOSHUA R. KIDDER, OF PORT CLINTON, OHIO.

LOUNGE-COT.

SPECIFICATION forming part of Letters Patent No. 497,580, dated May 16, 1893.

Application filed June 11, 1891. Renewed March 9, 1893. Serial No. 465,236. (No model.)

*To all whom it may concern:*

Be it known that I, JOSHUA R. KIDDER, of Port Clinton, in the county of Ottawa and State of Ohio, have invented certain new and useful Improvements in Lounge-Cots; and I do hereby declare the following to be a full, clear, and exact description of the invention, such as will enable others skilled in the art to which it pertains to make and use it, reference being had to the accompanying drawings, which form part of this specification.

My invention relates to an improvement in lounge cots and it consists in the construction and arrangement of parts, which will be fully described hereinafter, and particularly referred to in the claims.

The object of my invention is to provide a cot or lounge with a hinged frame carrying a folding canopy, of the construction hereinafter shown and described.

Figure 1:
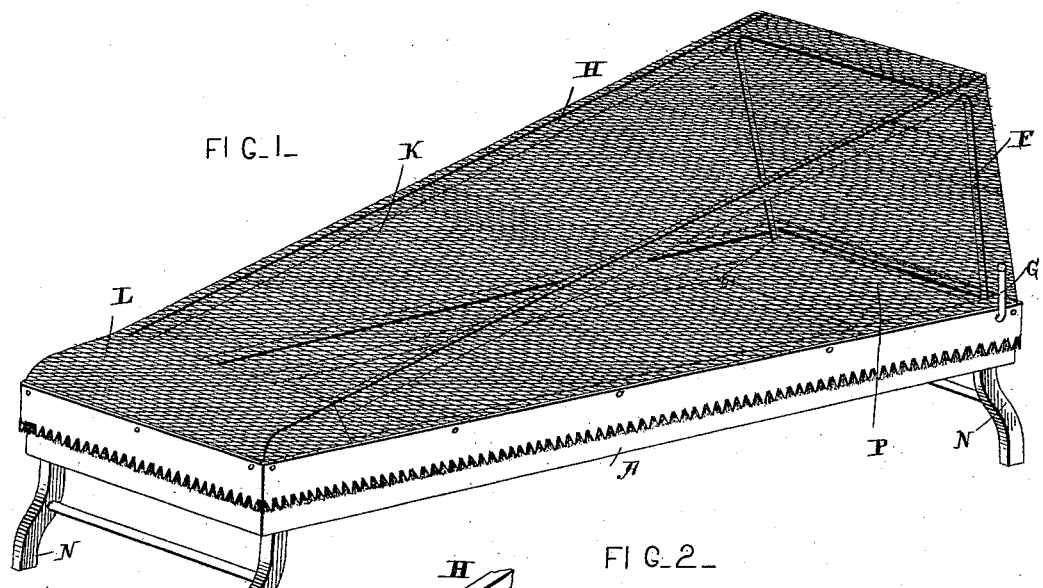
Figure 2:
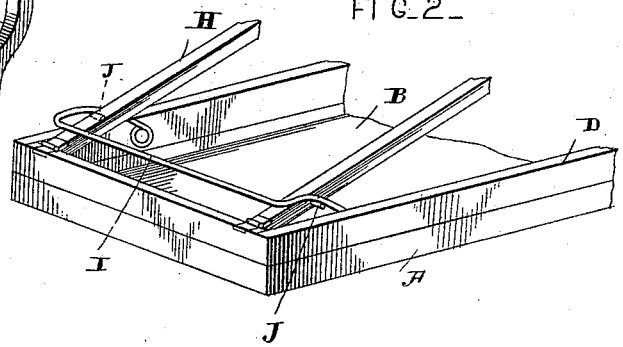
Figure 3:
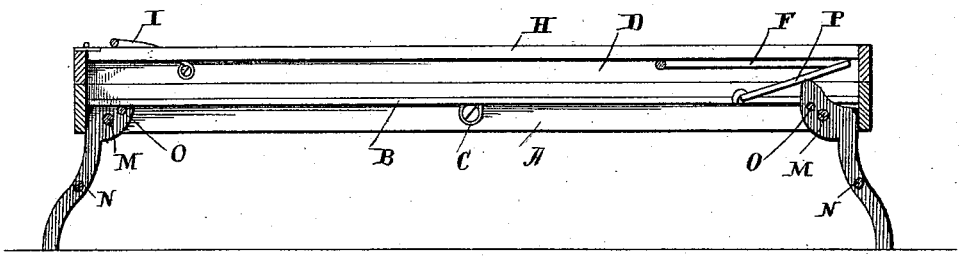

Figure 1 is a perspective view of a cot which embodies my invention. Fig. 2 is a detached view of the lower end of the cot, and the bail of wire for stretching the lower end of the canopy or mosquito netting upward. Fig. 3 is a side elevation partly in section showing the construction of the folding legs, and the manner in which they operate the head rest.

A indicates the lounge frame, which is preferably of the ordinary construction, and in this frame a second frame B, is placed. This frame B, is secured to the frame A, only at its center, by means of the screws and wire loops C, so that the ends of the frame B, have a downward spring tension, for the purpose of automatically holding the legs open and closed, all of which will be fully described hereinafter.

Hinged to the rear side of the frame A, is a frame D, of the same shape and size as the frame A. To one end of this frame A, is pivoted a U-shaped wire bail F., which has one end extending through the frame D., and bent into an operating handle G. The upper end of this wire bail F. engages the lower side of a frame H. which has its opposite ends pivoted, or otherwise loosely connected to the opposite ends of the frame D from the operating bail F. This frame H is of such a size that it fits within the frame D., so that it will fold downward, as shown in Fig. 3.

Pivoted to inner opposite sides of the frame D, is a second wire bail I., which is engaged by laterally extending pins or projections J, formed upon the outer sides of the frame H. By means of this construction when the outer end of the frame H, is raised by the bail F, the pins or projections J, engage the under side of the bail I., and force it upward for the purpose of raising the netting or canopy K, which is secured to the frame D. and passes upward, and around the frame H. Placed under the netting at the foot of the cot is a piece L, of any suitable material, for the purpose of strengthening the netting K., and which is engaged by the bail I. By means of this construction it will be seen that when the cot is folded, as shown in Fig. 3, it is only necessary to turn the bail F, upward by means of its handle G G., which extends outside of the frame D. This upward movement of the bail F, raises the front end of the frame H., and also the bail I, in the manner before described, which stretches the netting K, and makes room for the occupant of the lounge.

Extending across the frame A, at opposite ends thereof, are the rods M, upon which are pivoted the legs N. The upper ends of these legs extend inward, as shown, and are connected by means of a rod O, which rod engages the under side of the frame B., which rests upon the rod with a spring tension. In this manner it will be readily seen that when the legs are closed or open the spring tension of the frame B, holds them normally in their respective positions.

A head rest P. is pivoted, or loosely connected at its inner end to the head end of the frame B., and is engaged by the upper ends of the front legs N, when they are opened outward, as shown in Fig. 3. In this manner when the legs are opened outward the head rest is automatically raised, as will readily be understood.

From the above description it will be seen that I produce a cot, which is light and simple in construction, and which can be quickly and readily folded to be packed away, or opened out for use, as may be desired.

Having thus described my invention, I claim—

1. In an attachment for a cot, a main frame adapted to be placed upon the cot, a second frame pivoted at one end to one end of the main frame, a U-shaped bail pivoted in the opposite end of the main frame below the free end of the pivoted frame and engaging therewith, one end of the said bail extending through the main frame to form a handle, and a covering passing over the pivoted frame and secured to the main frame, all combined substantially as described.

2. An attachment for a cot, a main frame adapted to be placed upon the cot, a second frame pivoted at one end of the main frame and extending to the opposite end of the main frame, a U shaped bail pivoted in the main frame under the free end of the pivoted frame, and having one end formed into a handle, and a covering placed over the pivoted frame and secured to the main frame, all combined substantially as specified.

3. In a lounge cot, a frame adapted to be placed thereon, a second frame pivoted at one end thereto, a wire bail or lever for raising the opposite end of the pivoted frame, a second pivoted bail near the pivoted end or the pivoted frame, and pins or projections for operating the said pivoted bail, substantially as described.

In testimony whereof I affix my signature in presence of two witnesses.

JOSHUA R. KIDDER.

Witnesses:
 EPHRIAM ABIGES FOSTER,
 JOHN DELLEFS.